Feb. 27, 1940. A. J. SCHREIBER 2,191,916
METHOD OF FORMING ROLLER BEARING CUPS
Filed Feb. 28, 1938 3 Sheets-Sheet 1
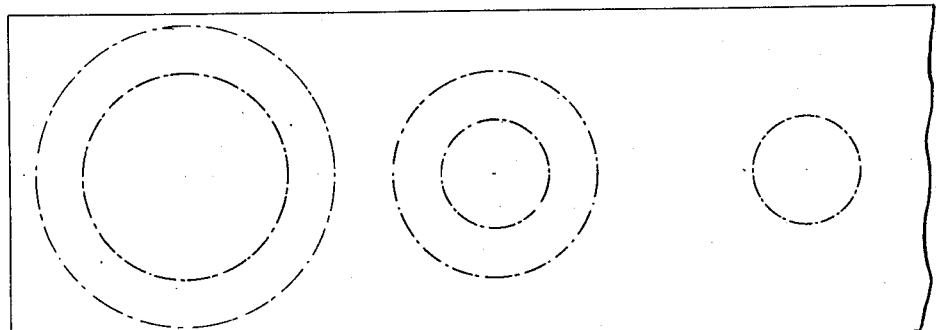
Fig. 1.
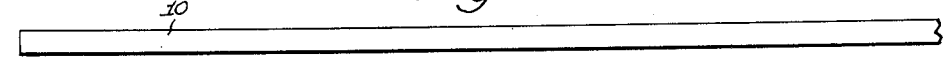
Fig. 2.
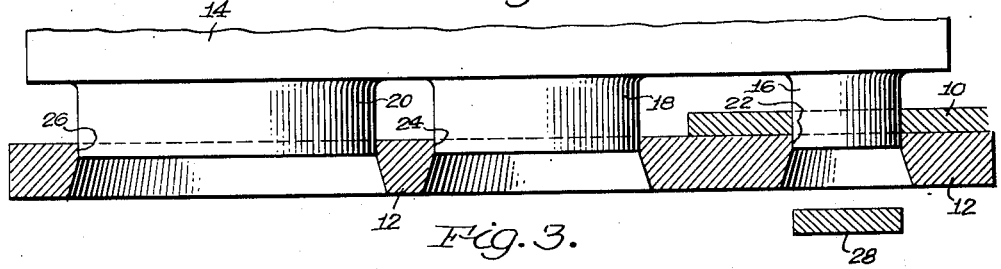
Fig. 3.
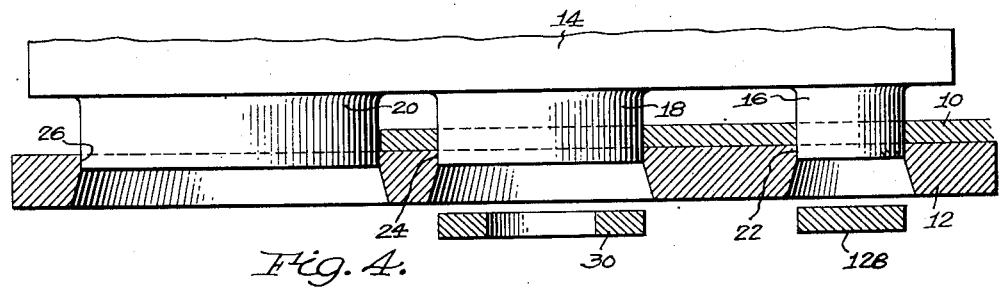
Fig. 4.
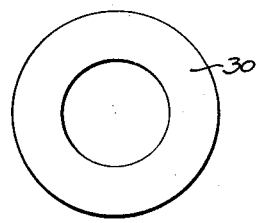
Fig. 5.
Inventor
Albert J. Schreiber,
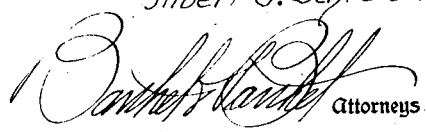
Attorneys Feb. 27, 1940. A. J. SCHREIBER 2,191,916
METHOD OF FORMING ROLLER BEARING CUPS
Filed Feb. 28, 1938 3 Sheets-Sheet 2
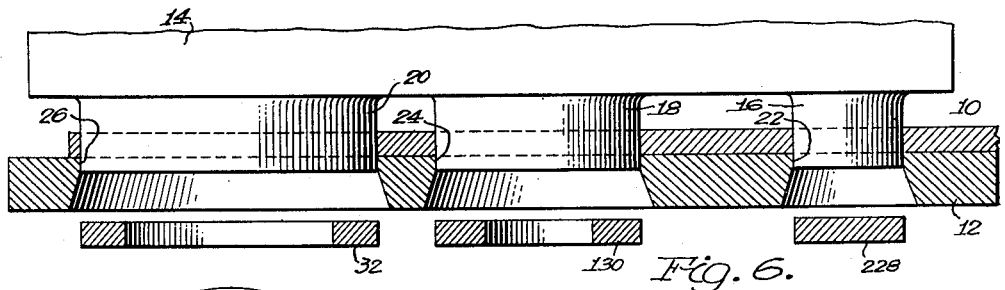
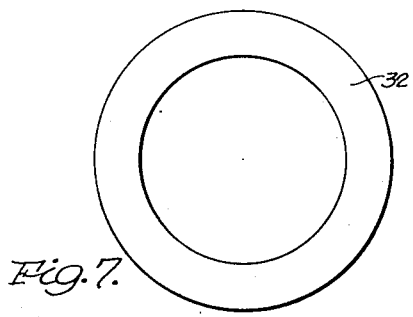
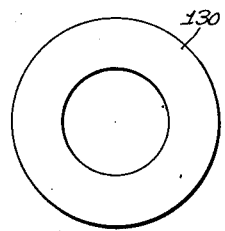
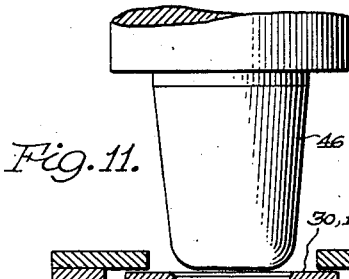
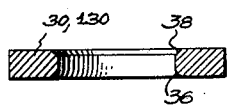
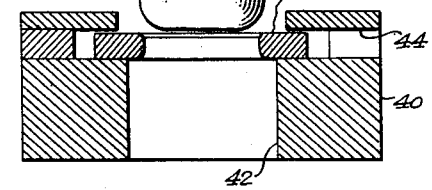
Inventor
Albert J. Schreiber,
By
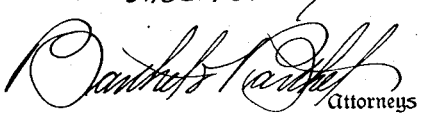
Attorneys Feb. 27, 1940.  A. J. SCHREIBER  2,191,916
METHOD OF FORMING ROLLER BEARING CUPS
Filed Feb. 28, 1938  3 Sheets-Sheet 3
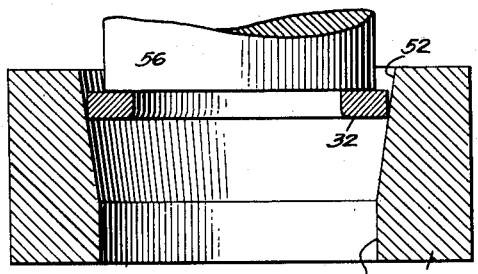
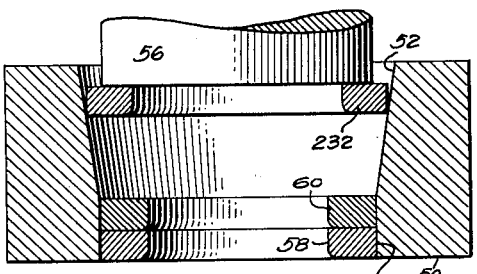
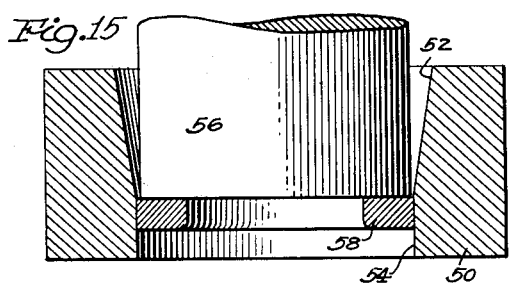
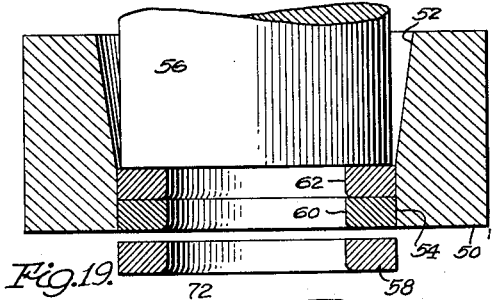
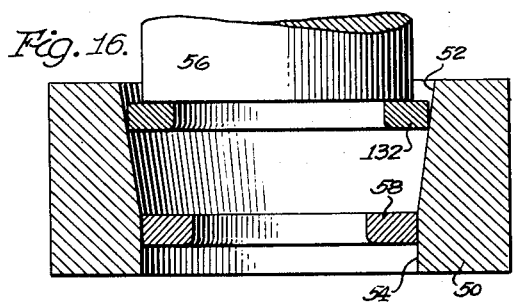
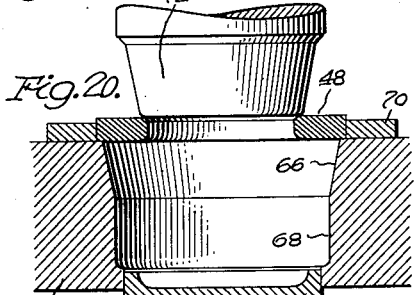
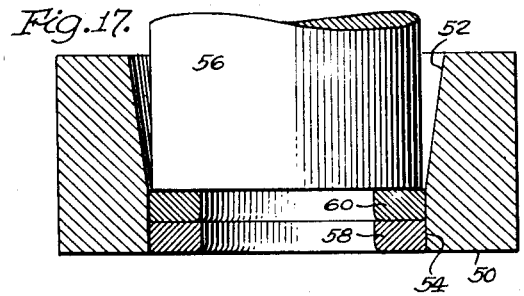
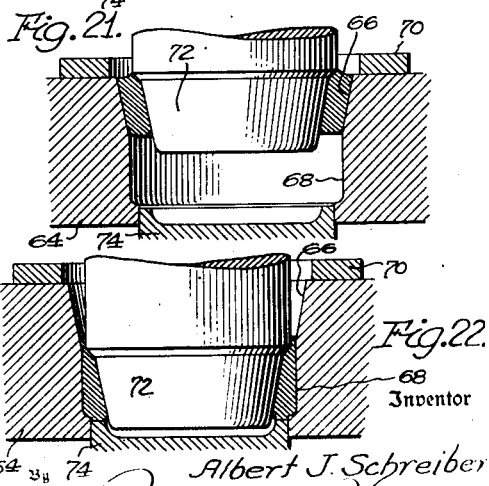
Inventor
Albert J. Schreiber
Attorneys Patented Feb. 27, 1940

2,191,916

UNITED STATES PATENT OFFICE 2,191,916

METHOD OF FORMING ROLLER BEARING CUPS

Albert J. Schreiber, Detroit, Mich., assignor to Bower Roller Bearing Company, Detroit, Mich., a corporation of Michigan Application February 28, 1938, Serial No. 193,042

4 Claims. (Cl. 29—148.4)

This invention relates in general to a new and novel method or process of manufacturing cups or races for roller bearings, and it particularly relates to the manufacture of the outer cup or race members for the bearing assemblies.

The main object of this invention is to effect the production of roller bearing cups or races having varied thicknesses and diameters from stock of standard thickness.

Another object is to effect the saving of time in the production of roller bearing cups or races by substituting fewer and more effective novel steps in the production for the steps previously followed in practice.

Another object is to produce a smoother and stronger roller bearing cup or race with fewer operations and less waste than previously employed.

Other objects and advantages will become readily apparent by reference to the accompanying drawings, of which there are three sheets and in which:

Figure 1 is a plan view of a blank suitable for use in connection with a process embodying the present invention and showing in dotted lines the punched out portions effected by the punching out steps;

Fig. 2 is an edge view of the blank of Fig. 1;

Fig. 3 is a sectional view of the female die member and the blank of Figs. 1 and 2, showing the blank supported upon the die in position subsequent to the first punching operation by the multiple punch shown above in elevation;

Fig. 4 is a view similar to Fig. 3, but showing the positions of blank and punch subsequent to the second punching operation;

Fig. 5 is a plan view of the ring blank punched out by the apparatus and process shown in Fig. 4;

Fig. 6 is a view similar to Figs. 3 and 4, but showing the positions of blank and punch subsequent to the third punching operation;

Figs. 7, 8 and 8a are plan views of the blanks punched out by the apparatus and process shown in Fig. 6;

Fig. 9 is an edge sectional view of the ring blank shown in Fig. 7 and showing the lower face as being internally chamfered;

Fig. 10 is an edge sectional view of the ring blanks shown in either Fig. 5 or 8 and showing the upper and lower faces as being internally chamfered;

Fig. 11 is a sectional view, partly in elevation and broken away, of the apparatus used in expanding the ring blanks shown in Figs. 5, 8 and 10;

Fig. 12 is a view similar to Fig. 11, but showing the blank and apparatus subsequent to the expanding operation;

Fig. 13 is an edge sectional view of the expanded blank;

Figs. 14, 15, 16, 17, 18 and 19 are sectional views, partly in elevation and broken away, of the apparatus for contracting the ring blanks shown in Figs. 7 and 9, and illustrating the successive steps of the contracting process;

Figs. 20, 21 and 22 are sectional views, partly in elevation and broken away, of a die and punch for forming the expanded or contracted ring blanks of Figs. 13 and 19 into cups, and illustrating the successive steps of the forming process, and Fig. 23 is a sectional view of the finished cup and illustrating by dotted lines the final machining operation.

The apparatus and process to be described herein are for the purpose of making blanks of the desired shape, size and thickness in the most economical manner and with the greatest speed possible, these blanks to be later formed into outer cup or race members for roller bearing assemblies. Attention is directed to the process as a whole, but in particular to that part thereof leading up to the actual cup formation.

Referring to Figs. 1 through 10, in which are disclosed the various steps of the punching process, there is shown a blank 10 of sheet metal which has the desired thickness and which is just wide enough for maximum economy, the length being within the limits of practicability. This blank 10 is movably supported on and by a rigid table die 12, so that said blank is free to move along said die and under and past a vertical multiple reciprocating punch 14 having a plurality of punch members 16, 18 and 20 mounted thereon. Die 12 has a series of apertures 22, 24 and 26 in vertical alignment with punch members 16, 18 and 20, respectively, each aperture having substantially the same diameter at its upper portion as that of its engaging punch member, and each aperture having a gradual increasing diameter at its lower portion for ready removability of work punched out by punch and die. The motive force and controlling or timing means for punch 14 may be of any desired type, the choice thereof forming no part of the invention.

Punch members 16, 18 and 20 are cylindrical in shape and sufficiently sturdy to withstand the work they are called upon to do. They are preferably mounted on the body 14 to be lowered or raised therewith as a unit. As shown in the figures, the diameter of punch member 16 is the same as the inner diameter of one of the desired rings, the diameter of punch member 18 is the same as the outer diameter of said desired ring and the inner diameter of another and larger desired ring, and the diameter of punch member 20 is the same as the outer diameter of said second mentioned ring. The saving of material and punching time seems evident, the arrangement of punches making it possible to produce two different sized rings at one time out of a blank having a diameter no greater than the diameter of the larger ring.

As shown in Figs. 3, 4 and 6, the blank 10 is guided and fed along the top of the die 12 from right to left. When the punching operation is about to be commenced, the distance the left end of the blank has been fed past the center of aperture 22 in die 12 should not be much more than the length of the radius of the aperture 26, this care being taken for economical reasons. Punch 14 is then lowered, see Fig. 3, and a blank 28 is punched out of blank 10 by punch member 16. The center of the aperture thus made in blank 10 is then vertically lined up with the center of the aperture 24 in die 12 by feeding the blank 10 along die 12 for the proper distance. The punch 14 is again lowered, see Fig. 4, the punch member 16 again punching out a blank 128 similar to the blank 28, and punch member 18 punching out a ring blank 30 having an inner diameter equal to the diameter of the blanks 28 and 128. The blank 10 is then moved further to the left to a position where the center of the aperture formed in blank 10 by the removal therefrom of blank 30 and the center of the aperture 26 in die 12 will be in vertical alignment. Again the punch 14 is lowered, see Fig. 6, this time blanks 228, 130, and 32 being punched out of blank 10 by punch members 16, 18 and 20, respectively. Obviously, until the length of blank 10 has been used up, any further step in punching will be similar to that shown in Fig. 6, producing two ring blanks each time the punch 14 is lowered. The blanks 28, 128 and 228 may either be discarded as waste, or they may be processed into ring blanks by any known method.

As shown in Fig. 9, the ring blank 32 is then chamfered or otherwise machined as at 34. Also, the ring blanks 30 or 130, see Fig. 10, are chamfered or otherwise machined as at 36 and 38. These steps of machining the blanks 30, 130 and 32 are important inasmuch as the shear strength set up by the punching process causes cracks to develop at the inner diameters of the ring blanks, and these cracks, for the sake of smoothness in the final product, must be removed.

The economy derived from the procurement of two ring blanks from a single blank of given diameter and thickness has already been described, but it stands to reason that the dimensions desired for a ring which is ready to be punched into a cup or race for the bearing assembly are still wanting. Therefore, it is proposed that the blanks undergo further operations.

In Figs. 11 and 12 there is shown a die member 40 which is properly supported for rigidity, and which has a cylindrical bore 42 having a diameter equal to the desired inner diameter of a ring blank which is ready to be formed into a cup or race for a roller bearing assembly. Near the top of member 40, and formed therein, is a slotted horseshoe shaped guideway 44 which extends from one side of member 40 across the bore 42 and which is so sized as to permit ring blanks 30 or 130, after being inserted through the guideway 44 and centered with bore 42, to be circumferentially spaced from the walls of said guideway, both for permitting expansion of rings 30 or 130 and for removal thereof after expansion. Suitably supported above die member 40 and in vertical alignment with bore 42 and for vertical reciprocable movement is a punch 46 which has a downwardly tapered surface, the lower extremity of which is of a diameter substantially equal to the inner diameter of ring blanks 30 or 130, and an intermediate portion of which has a diameter equal to the inner diameter of the desired ring. Before the punch 46 is lowered, as in Fig. 12, the ring 30 or ring 130 is placed in proper position in die member 40. The punch is then lowered to the level shown in Fig. 12 and at which the diameter of said intermediate portion is equal to the desired diameter of the new ring. Punch 46 thus expands ring 30 or 130 into the new ring 48, the expansion being necessarily beyond the elastic limit of the metal in the ring so that the ring 48 will retain its deformed shape. This expanding process is used when the ring blanks, such as 30 and 130, do not have the proper diameters and thickness, since the process, as can be seen in a comparison of the blanks shown in Figs. 11 and 10 with those shown in Figs. 12 and 13, tends to materially produce a thinner ring (which results in a thinner walled cup or race) with greater inner and outer diameters (the expanding process spreading out the material of the blank and causing the outer circumference to overlap the circumference of the die bore shown in Fig. 20 and causing the inner diameter to be overlapped by the punch shown in said figure, so that said blank can be formed into a cup or race by said die and punch members).

For the purpose of reducing the inner and outer diameters of the ring blank 32, the process of contracting said blank is proposed as distinguished from the expansion of ring blanks 30 and 130. In Figs. 14 through 19 are shown the successive steps of the contraction process, in which a die member 50, rigidly supported in any suitable manner, is shown as having a combined cylindrical and tapered bore, the tapered portion being represented at 52, and the cylindrical portion being represented at 54. Vertically and centrally disposed with respect to said bore is a cylindrical plunger 56, said plunger being supported and driven in any suitable manner for reciprocable movement into and out of said bore, the diameter of which plunger is substantially equal to the diameter of cylindrical portion 54 of said bore and also to the desired outer diameter of a finished ring blank to be formed into a cup or race for a bearing assembly. Into the upper open end of the tapered portion 52 of the bore in the die 50 is introduced the ring blank 32, as shown in Fig. 14. The plunger 56 is then lowered, as shown in Fig. 15, contracting the blank 32 into its deformed shape 58 of greater thickness and reduced inner and outer diameters. Another blank 132, similar to blank 32, is introduced into the bore of the die 50, as shown in Fig. 16, and is similarly contracted, as shown in Fig. 17, into its new shape 60 similar to 58, the operation displacing the contracted blank 58 to a lower level in bore 54. Then again, as in Fig. 18, another blank 232, similar to blanks 32 and 132, is introduced into the bore 52, and the plunger 56 is then caused to be moved downwardly, as in Fig. 19, contracting blank 232 into its new shape 62 similar to 58 and 60 and displacing both of the blanks 58 and 60, the blank 58 being displaced entirely from the die member 50. This process of contracting the ring blanks 32, 132 and 232 into their desired size and thickness has a tendency to increase the quality of the metal, as is true in most cases of cold-work compression.

It is to be noted that, with the proper dies and punches, the smaller rings 30 and 130 can be contracted as well as expanded, such as when greater thicknesses and smaller diameters than shown are desired; also, this invention contemplates the expansion of the larger rings 32, 132 and 232, such as when lesser thicknesses and greater diameters than shown are desired. It is also contemplated that the inner and outer diameters of rings 30 and 130 and of the rings 32, 132 and 232, will and can be changed at will.

After the ring blanks have been either expanded or contracted, as above described, they are ready for the usual cup forming process, the apparatus for and steps of which are outlined in Figs. 20, 21 and 22. For the purposes of illustration, the apparatus shown in these figures is adapted for the expanded ring blank 48, shown in Figs. 12 and 13, but it is obvious that such apparatus, without going outside the scope of the invention, could as well be adapted for the contracted ring blanks 58, 60 and 62. In these figures is shown a die block 64, suitably supported for rigidity, and having a tapered bore 66 therein with a cylindrical bore 68 in communication therewith. Supported upon the die block 64 and centrally located with respect to the bores 66 and 68 is a centering member 70, said member 70 having an opening therein the diameter of which being substantially equal to the outer diameter of the ring blank 48 for reception of said blank in said opening. Supported above the die 64 and adapted for reciprocable movement into and out of the bore 66—68 is a punch plunger 72 having a combined tapered and cylindrical surface. The diameter of the lower portion of the tapered surface of plunger 72 is slightly greater than the inner diameter of the ring blank 48 (or any other blank to be formed into a cup by this process), and this diameter progressively increases thereabove so that, preferably, the wall of the taper is substantially parallel with the wall of the tapered bore 66 of the die block 64. Disposed within a reduced portion of the cylindrical bore 68 in the die block 64 is a plug member 74 which is cupped at its upper end to receive the lower end of the punch 72 when same is lowered to its lowest level.

As shown in Fig. 20, the ring blank 48 is placed in the opening in centering member 70, the circumference of the blank outwardly overlapping the top edge of the tapered bore 66, and the outer diameter of the blank being greater than the diameter of the cylindrical portion of the punch 72. Since the inner diameter of the blank 48 is less than the diameter of the lowest portion of the tapered punch 72, and since the outer diameter of the blank causes the blank to overlie the bore 66 in die 64, initial downward pressure on punch 72 causes the blank 48 to take the shape shown in Fig. 21. As shown in Fig. 21, the upper and lower chamfered portions (see also Fig. 10) of the inner circumference of the blank 48 have been displaced by the upsetting process and are at the bottom inner and outer edges of the upset blank, and also as shown in Fig. 21 the metal has been compressed between the walls of the die bore and punch taper, the initial formation of the cup taking place during the upsetting process. Further application of force on the punch 72 represents the final step in the formation of the cup, as shown in Fig. 22, the cup being forced down into the cylindrical portion 68 of the bore in die 64 by the combination of forces exerted upon the inner surface of the cup by the shoulder on and the tapered surface of the punch 72. The upper annular surface of the plug 74 serves to shape the bottom annular surface of the cup, and the portion of the cup lying above a horizontal plane drawn through the upper edge of the shoulder on the punch separating its cylindrical and tapered surfaces can be ground off as waste, as shown by dotted lines in Fig. 23. As has been said previously, the subject matter embodied in the Figs. 20 through 23 comprises no part of this invention, the same can be readily understood from a reference to my United States Patent No. 2,014,605.

While the invention has been described with some detail, it is to be understood that the description is for the purposes of illustration only and is not definitive of the limits of the inventive idea. The right is reserved to make such changes as will fall within the purview of the attached claims.

What I claim is:

1. The method of forming a race member for a roller bearing assembly which comprises, punching a disk of predetermined diameter from a strip of sheet metal, subsequently punching a ring from the portion of the strip symmetrically about the void provided by the removal of the disk, expanding the ring to increase its inner and outer diameters simultaneously, and upsetting the expanded ring into the form of a hollow, elongated member.

2. The method of forming a race member for a roller bearing assembly which comprises, punching a blank of predetermined outer diameter from a strip of sheet metal, subsequently punching a ring from the portion of the strip symmetrically about the void provided by the removal of the blank, contracting the ring to decrease its inner and outer diameters simultaneously, and upsetting the contracted ring into the form of a hollow, elongated member.

3. The method of forming a race member for a roller bearing assembly which comprises, punching a disk of predetermined diameter from a strip of sheet metal, subsequently punching a ring of undersized dimensions from the strip symmetrically about the void provided by the removal of the disk, subsequently punching a ring of oversized dimensions from the strip symmetrically about the void provided by the removal of the first ring, expanding the first ring to increase simultaneously both its diameters, contracting the second ring to decrease simultaneously both its diameters, and upsetting both rings to form hollow, elongated members.

4. The method of forming blanks for race members of roller bearing assemblies which comprises, punching a disk of predetermined diameter from a strip of sheet metal, punching a ring from the strip with the centers of the voids created by the removal of the disk and ring from the strip coincident and the inner diameter of the ring equal to the diameter of the disk, punching a ring from the strip with the centers of the voids created by the removal of the disk and rings from the strip coincident and the inner diameter of the second ring equal to the outer diameter of the first ring, expanding the first ring to increase both of its diameters, and contracting the second ring to decrease both of its diameters so that the inner diameter thereof dimensionally approaches the inner diameter of the expanded ring and the outer diameter thereof dimensionally approaches the expanded outer diameter.

ALBERT J. SCHREIBER.